United States Patent
Fawcett

(10) Patent No.: US 10,850,814 B2
(45) Date of Patent: Dec. 1, 2020

(54) LARGE BORE PIERCE PIN FOR AN INFLATOR

(71) Applicant: Halkey-Roberts Corporation, St. Petersburg, FL (US)

(72) Inventor: Lyman Fawcett, St. Petersburg, FL (US)

(73) Assignee: Halkey-Roberts Corporation, St. Petersburg, FL (US)

( * ) Notice: Subject to any disclaimer, the term of this patent is extended or adjusted under 35 U.S.C. 154(b) by 0 days.

(21) Appl. No.: 16/540,900

(22) Filed: Aug. 14, 2019

(65) Prior Publication Data

US 2020/0055580 A1   Feb. 20, 2020

Related U.S. Application Data

(60) Provisional application No. 62/718,915, filed on Aug. 14, 2018.

(51) Int. Cl.
*B63C 9/00* (2006.01)
*B63C 9/04* (2006.01)

(52) U.S. Cl.
CPC ............. *B63C 9/00* (2013.01); *B63C 9/04* (2013.01); *B63C 2009/0023* (2013.01); *B63C 2009/042* (2013.01)

(58) Field of Classification Search
CPC ..... B63C 9/00; B63C 9/04; B63C 2009/0023; B63C 2009/042; B65B 3/17
USPC ................. 222/5, 83.5, 80, 81; 53/403, 79; 137/68.29, 68.3; 83/660, 682, 684–696, 83/30, 881, 102, 123; 234/47, 131
See application file for complete search history.

(56) References Cited

U.S. PATENT DOCUMENTS

| | | | | |
|---|---|---|---|---|
| 2,122,368 A | * | 6/1938 | Engler | B26F 1/44 83/862 |
| 2,279,390 A | * | 4/1942 | Ekstedt | B21D 51/10 83/162 |
| 3,283,974 A | * | 11/1966 | de Boo | B26F 1/22 225/2 |
| 3,490,648 A | | 1/1970 | Fujimoto | |
| 3,580,269 A | * | 5/1971 | Ehrens | F16L 41/065 137/318 |
| 3,762,263 A | * | 10/1973 | Bocceda | F16L 41/065 83/660 |
| 3,802,324 A | * | 4/1974 | Izumi | B65D 75/50 493/213 |
| 3,815,783 A | | 6/1974 | Hirata | |
| 4,498,604 A | * | 2/1985 | Mackal | B63C 9/24 141/329 |
| 4,498,605 A | * | 2/1985 | Mackal | B63C 9/24 222/5 |

(Continued)

FOREIGN PATENT DOCUMENTS

DE    3644758 A1    7/1988

*Primary Examiner* — Patrick M. Buechner
*Assistant Examiner* — Michael J. Melaragno
(74) *Attorney, Agent, or Firm* — GrayRobinson, P.A.

(57) ABSTRACT

A pierce pin for an inflator for piercing the frangible seal of a gas cartridge including in combination a shaft having a axial bore forming a tubular member having a tip with a rim and a pair of slots formed across the rim into the tip into the tubular member to an appreciable depth to form a tab, the tab being bent inwardly into the axial bore after formation of the slots.

16 Claims, 3 Drawing Sheets

(56) References Cited

U.S. PATENT DOCUMENTS

| | | | | |
|---|---|---|---|---|
| 4,682,619 | A | * | 7/1987 | Clift .................... F16K 17/1626 |
| | | | | 137/68.26 |
| 5,026,310 | A | * | 6/1991 | Mackal ..................... B63C 9/24 |
| | | | | 441/92 |
| 5,058,635 | A | * | 10/1991 | Mackal ..................... B63C 9/24 |
| | | | | 141/19 |
| 5,076,468 | A | * | 12/1991 | Mackal ..................... B63C 9/24 |
| | | | | 222/5 |
| 5,400,922 | A | * | 3/1995 | Weinheimer ............. B63C 9/24 |
| | | | | 222/192 |
| 5,544,670 | A | | 8/1996 | Phillips |
| 5,564,478 | A | * | 10/1996 | Weinheimer ............. B63C 9/24 |
| | | | | 141/19 |
| 5,601,124 | A | * | 2/1997 | Weinheimer ............. B63C 9/24 |
| | | | | 141/19 |
| 6,089,403 | A | | 7/2000 | Mackal |
| 7,178,547 | B2 | | 2/2007 | Mackal |
| 7,673,647 | B2 | * | 3/2010 | Mackal ..................... B63C 9/24 |
| | | | | 137/68.3 |
| 7,854,347 | B2 | * | 12/2010 | Wang ....................... B63C 9/24 |
| | | | | 141/329 |
| 8,360,276 | B2 | * | 1/2013 | Rogier ..................... B63C 9/18 |
| | | | | 222/5 |
| 9,517,956 | B2 | | 12/2016 | Mackal |
| 2008/0000926 | A1 | | 1/2008 | Wang |
| 2011/0000550 | A1 | * | 1/2011 | Rogier ..................... B63C 9/19 |
| | | | | 137/1 |
| 2015/0166422 | A1 | * | 6/2015 | Mackal ................... C06D 5/00 |
| | | | | 102/530 |

* cited by examiner

LARGE BORE PIERCE PIN FOR AN INFLATOR

CROSS-REFERENCE TO RELATED INVENTIONS

This application claims the benefit of provisional application No. 62/718,915, filed Aug. 14, 2018.

BACKGROUND OF THE INVENTION

Field of the Invention

This invention relates to inflators. More particularly, this invention relates to inflation valves for compressed gas cylinders used for inflating inflatable articles such as life rafts.

Description of the Background Art

Presently there exist many types of inflation valves designed to be used in conjunction with compressed gas cylinders or the like. In their simplest forms, inflation valves include a knob or handle which is turned to open a cylinder of compressed gas to inflate the inflatable article. However, even more prevalent are inflation valves for sealed gas cylinders having a sealed, frangible seal to which the inflator is threadably mounted. Inflation valves of this type are operable by means of a jerk handle and lanyard cord that allow the inflatable article to be quickly inflated by a simple jerking of the handle which then forces a pierce pin to fracture the frangible seal of the gas cylinder, thereby allowing the compressed gas therein to flow out of the gas cylinder to inflate the inflatable article.

Due to the large force necessary to fracture the frangible seal of a conventional gas cylinder, particularly for raft inflators that require inflation from a large gas cartridge, more contemporary designs of inflation valves employ a powerful firing spring which is held in its cocked position by means of a sear. Upon pulling of the jerk handle by the user, the sear is released allowing the powerful spring to very forcibly force the pierce pin through the frangible seal of the gas cylinder. The gas from the cylinder then flows through the bore of the pierce pin, through the inflator's inflation manifold and into the interior volume of the inflatable article.

Some inflatable articles require rapid filling of very large volumes. For example, a raft inflator in the aircraft industry typically comprises an inflatable emergency slide for escaping a downed aircraft. An aircraft raft inflator must therefore be capable of rapidly filling the very large-volume of the slide to allow the passengers to slide down the slide to quickly evacuate the aircraft. After evacuation, the fully-inflated slide may then be disconnected from the aircraft and used as a life raft for the escaped passengers. Representative patents on inflators designed for rapid filling of high-volume inflation rafts are disclosed in U.S. Pat. Nos. 6,089,403, 7,178,547 and 9,517,976, the disclosures of each of which are hereby incorporated by reference herein.

Accordingly, a raft inflator typically employs a large-bore pierce pin that is forcibly driven through the frangible seal of the gas cylinder, with the bore of the pierce pin being of sufficient diameter to achieve the desired fill-rate after firing. Unfortunately, however, a large-bore pierce pin may core the frangible seal of the gas cartridge producing a floating chip or "slug" that might be blown back into the inflator by the high pressure gas now flowing from the gas cartridge into the inflator. The floating slug may then clog the inflator's inflation manifold, significantly reducing the rate of filling of the raft inflator.

Therefore, an object of this invention to provide an improvement which overcomes the aforementioned inadequacies of the prior art devices and provides an improvement which is a significant contribution to the advancement of the inflator art.

Another object of this invention is to provide an inflator having a large-bore pierce pin having a bore diameter that is capable of achieving the desire fill rate of the inflatable.

Another object of this invention is to provide an inflator having a large-bore pierce pin that precludes the frangible seal of the gas cartridge from being cored during piercing, thereby obviating the possibility of the free-floating, cored slug from being blown back into the inflator and obstructing gas flow into the inflatable.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a large bore pierce pin for an inflator fluidly connected to an inflatable device such as an airline emergency raft. Upon actuation of the inflator, the pierce pin pierces the frangible seal of a gas cartridge connected to the inflator, whereupon the gas escaping from the gas cartridge flows through the inflator into the inflatable device at a desired flow rate to rapidly fill the inflatable device. The pierce pin comprises an inwardly extending tab. The inwardly extending tab minimizes the possibility of a free-floating, cored slug from the frangible seal of the gas cartridge during piercing from being blown back into the inflator and obstructing gas flow into the inflatable device.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
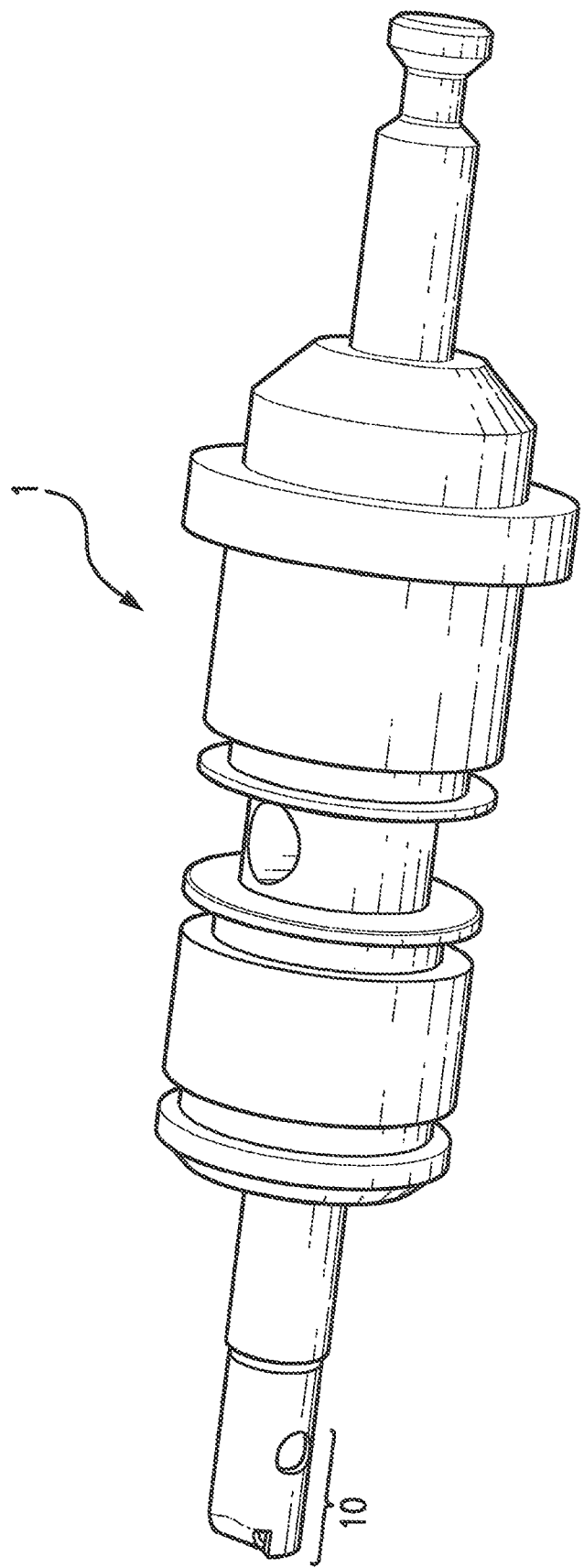
FIG. 1 is a perspective view of the pierce pin of the invention incorporated into a typical ballasted pierce pin assembly.
Figure 2:
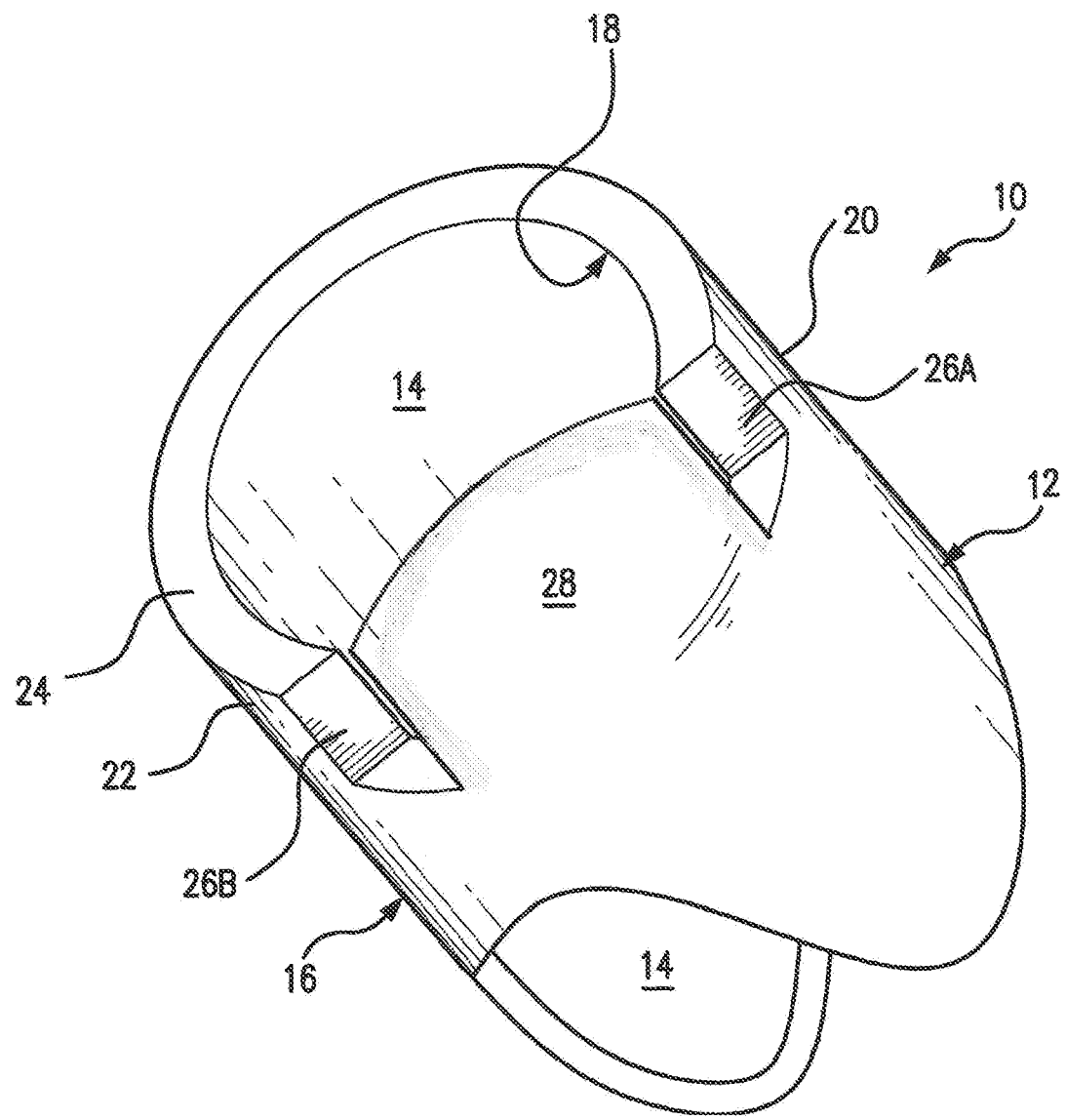
FIG. 2 is an enlarged perspective view of the pierce pin of the invention.

FIG. 1 is a perspective view of the pierce pin 10 of the invention incorporated into a typical pierce pin assembly 1. The pierce pin 10 of the invention may be incorporated into various types of pierce pin assemblies 1 and therefore the pierce pen assembly 1 is shown in phantom.

The pierce pin 10 of the present invention comprises a generally circular cylindrical shaft 12 having a circular cylindrical axial bore 14 forming a tubular member 16. The diameter of the axial bore 14 is designed to achieve the desired rate of flow of the gas escaping the gas cartridge of the inflator. The lumen 18 and the outside surface 20 of the tubular member 16 are generally concentric such that the wall thickness extending from the lumen 18 of the axial bore 14 to the outside surface 20 of the tubular member 16 is generally uniform. Correspondingly, the tip 22 of the pierce pin comprises a generally circular cylindrical rim 24 of uniform thickness.

A pair of aligned slots 26A and 26B are milled across a chord (i.e., not a diameter) of the rim 24 into the tip 22 into the tubular member 16 to an appreciable depth D to define a "minor arc" segment or tab 28 defined by the angle of the chord which in turn defines the distance from the center of the arc to the center of its base (i.e., sagitta) of the tab 28. The aligned slots 26A and 26B are preferably coplanar as such would be simultaneously made by an end mill during manufacturing.

Figure 3:
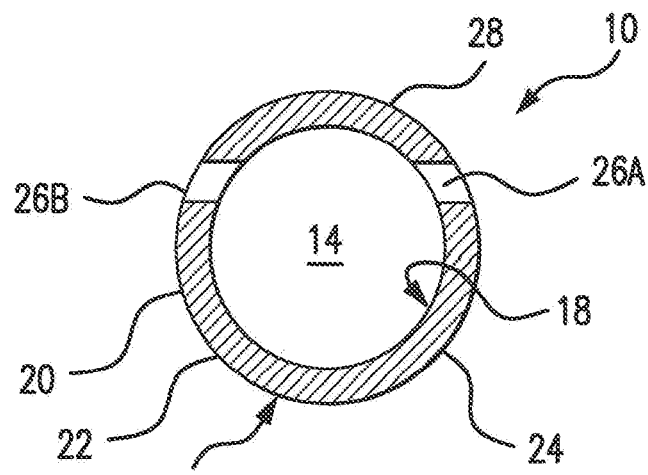
FIG. 3 is a transverse cross-sectional view of the tip of the pierce pin before bending of the tab inwardly during manufacturing.
Figure 4:
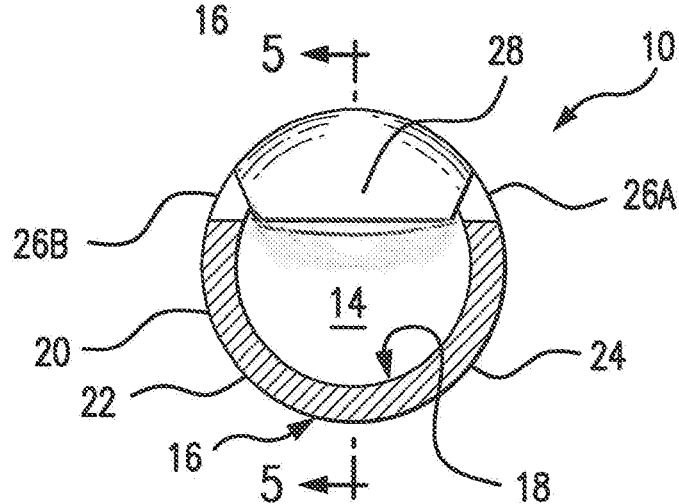
FIG. 4 is a transverse cross-sectional view of the tip of the pierce pin after bending of the tab inwardly.
Figure 5:
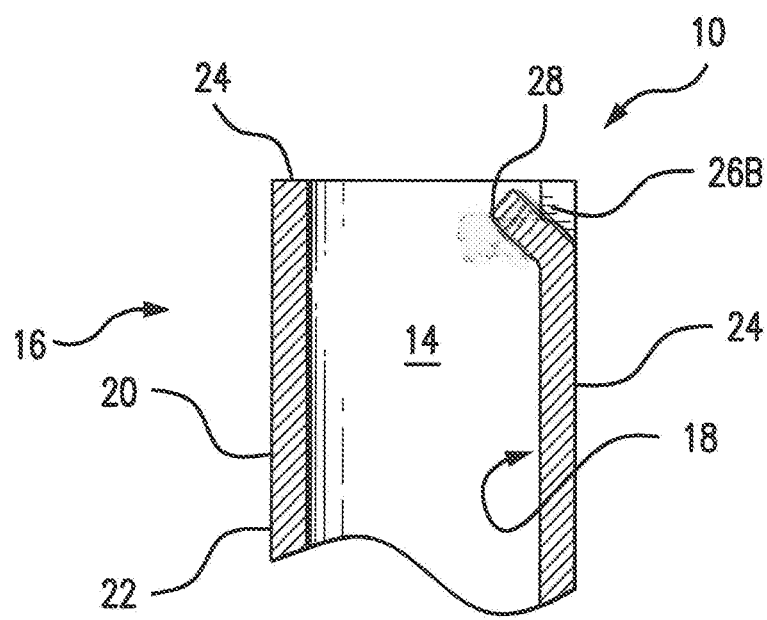
FIG. 5 is a longitudinal cross-sectional view along lines 5-5 of FIG. 4 showing the inwardly bent tab.

During manufacturing, comparing FIG. 3 with FIG. 4, the arcuate tab 28 is bent inwardly into the axial bore 14. After bending of the arcuate tab 28 inwardly, the rim 24 of the tip 22 of the pierce pin 10 comprises a blunt "great arc" rim 24 due to the fact that the minor arc segment or tab 28 is bent inwardly.

Upon actuation of the inflator to drive the pierce pin 10 toward the frangible seal of the gas cartridge, the great arc rim 24 impacts the frangible seal of the gas cartridge. Upon impact, the great arc rim 24 forcibly punches an arcuate hole into the frangible seal of the gas cartridge, with the arcuate hole having the same great arc dimension as the great arc rim 24, to thereby define a great arc cored slug from the punched out part of the frangible seal of the gas cartridge, with the cored slug having the same dimension as the great arc rim 24. However, inasmuch as the minor arc tab 28 had been bent inwardly during manufacturing, during impact of the pierce pin with the frangible seal of the gas cartridge, it does not punch through the frangible seal; rather, the cored slug remains attached to the frangible seal of the gas cartridge along the length of the minor arc tab 28. During piercing, the cored slug is therefore precluded from separating from the frangible seal and becoming free-floating and potentially being blown back into the inflator and obstructing gas flow into the inflatable device.

The present invention includes that contained in the appended claims as well as that of the foregoing description. Although this description has been described in its preferred form with a certain degree of particularity, it should be understood that the present disclosure of the preferred form has been made only by way of example and that numerous changes in the details of construction, combination, or arrangement of parts thereof may be resorted to without departing from the spirit and scope of the invention.

Now that the invention has been described,

What is claimed is:

1. A pierce pin for an inflator for piercing the frangible seal of a gas cartridge, comprising in combination:
   a shaft having a axial bore forming a tubular member having a tip with a rim; and
   a pair of slots formed across said rim into said tip into said tubular member to a depth to form a tab, said tab being bent inwardly into said axial bore after formation of said slots.

2. The pierce pin as set forth in claim 1 wherein said shaft is circular cylindrical.

3. The pierce pin as set forth in claim 2, wherein said axial bore is circular cylindrical.

4. The pierce pin as set forth in claim 3, wherein said rim is circular cylindrical.

5. The pierce pin as set forth in claim 4, wherein said slots are formed across a chord of said rim.

6. The pierce pin as set forth in claim 5, wherein said tab is defined by the angle of said chord which in turn defines the distance from the sagitta of said tab.

7. The pierce pin as set forth in claim 6, wherein the diameter of said axial bore achieves the desired rate of flow of the gas escaping the gas cartridge of the inflator.

8. The pierce pin as set forth in claim 7, wherein the lumen and the outside surface of said tubular member are concentric such that the wall thickness extending from the lumen of said axial bore to the outside surface of said tubular member is generally uniform.

9. The pierce pin as set forth in claim 8, wherein said tip comprises a circular cylindrical rim of uniform thickness.

10. The pierce pin as set forth in claim 9, wherein said slots are aligned.

11. The pierce pin as set forth in claim 10, wherein said slots are coplanar.

12. The pierce pin as set forth in claim 11, wherein after bending inwardly said tab defining a minor arc segment, said rim of said tip comprises a blunt great arc rim.

13. The pierce pin as set forth in claim 12, wherein upon impact of said tip with the frangible seal of the gas cartridge, said great arc rim forcibly punches an arcuate hole into the frangible seal of the gas cartridge, with the arcuate hole having the same great arc dimension as the great arc rim, to thereby define a great arc cored slug from the punched out part of the frangible seal of the gas cartridge, with the cored slug having the same dimension as the great arc rim.

14. The pierce pin as set forth in claim 13, wherein said tab does not punch through the frangible seal.

15. The pierce pin as set forth in claim 14, wherein a cored slug of the frangible seal remains attached to the frangible seal along the length of said tab.

16. The pierce pin as set forth in claim 15, wherein said cored slug is precluded from separating from the frangible seal.

\* \* \* \* \*